United States Patent
Chiba et al.

(10) Patent No.: US 6,651,120 B2
(45) Date of Patent: Nov. 18, 2003

(54) IMAGE DATA CONVERTING SYSTEM AND A STORAGE MEDIUM THEREOF

(75) Inventors: Hirotaka Chiba, Kawasaki (JP); Nobuyasu Yamaguchi, Kawasaki (JP); Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 09/816,107

(22) Filed: Mar. 26, 2001

(65) Prior Publication Data

US 2002/0032815 A1 Mar. 14, 2002

(30) Foreign Application Priority Data

Sep. 14, 2000 (JP) ......................................... 2000-280392

(51) Int. Cl.[7] .............................................. G06F 13/12
(52) U.S. Cl. ............................. 710/65; 710/30; 710/52; 709/236; 382/182
(58) Field of Search .................. 710/1, 30, 36, 710/52, 65, 66, 112; 709/223, 231, 236, 246; 712/225; 382/182; 358/1.15, 400

(56) References Cited

U.S. PATENT DOCUMENTS 5,442,749 A * 8/1995 Northcutt et al. ...... 395/200.09
6,256,107 B1 * 7/2001 Toda .......................... 358/1.15
6,272,530 B1 * 8/2001 Horiuchi et al. ............. 709/206
6,473,153 B2 * 10/2002 Iguchi et al. .................. 355/40
6,493,103 B2 * 12/2002 Toyoda et al. ............. 358/1.15
6,552,743 B1 * 4/2003 Rissman .................. 348/207.2

FOREIGN PATENT DOCUMENTS

| JP | 5-12484 | 1/1993 |
|---|---|---|
| JP | 5-108814 | 4/1993 |
| JP | 5-122501 | 5/1993 |
| JP | 10-32667 | 2/1998 |
| JP | 2000-201261 | 7/2000 |

* cited by examiner

*Primary Examiner*—Jeffrey Gaffin
*Assistant Examiner*—Rijue Mai
(74) *Attorney, Agent, or Firm*—Staas & Halsey LLP

(57) ABSTRACT

A user specifies image data to be transferred and the conversion form of the image data. An information processing device instructs an image data obtaining device to transfer the specified image data. The transferred image data is converted into data in the form specified by the user. The image data to be transferred and the specification of its conversion form are simultaneously received, so that the image data is transferred and converted at the same time. Accordingly, user operations are reduced and user operability can be improved.

16 Claims, 16 Drawing Sheets

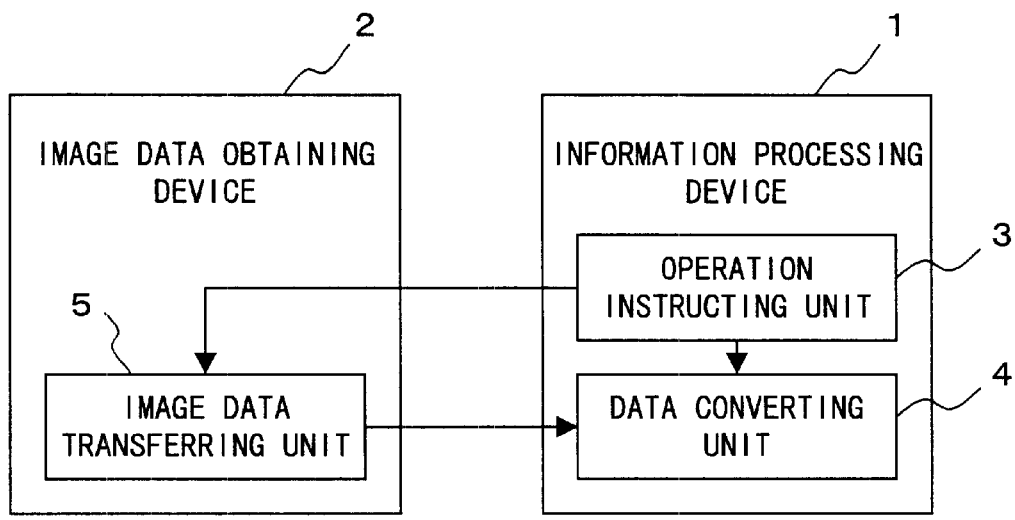
F I G. 2A
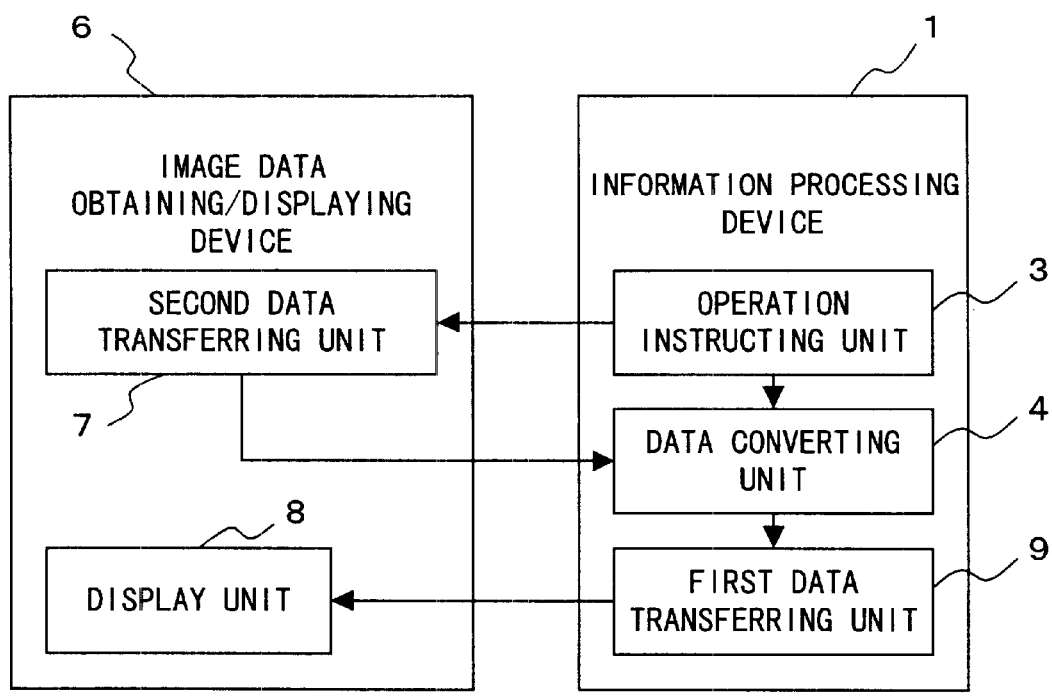
F I G. 2B

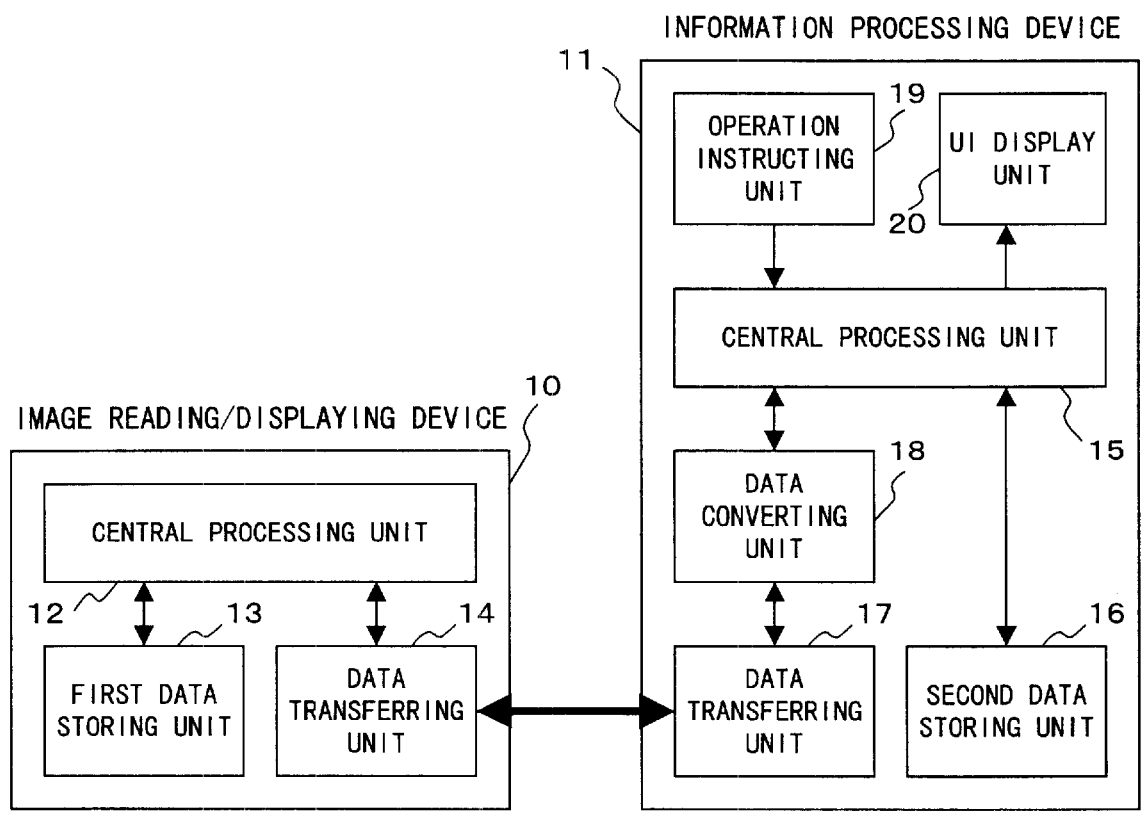
F I G. 3

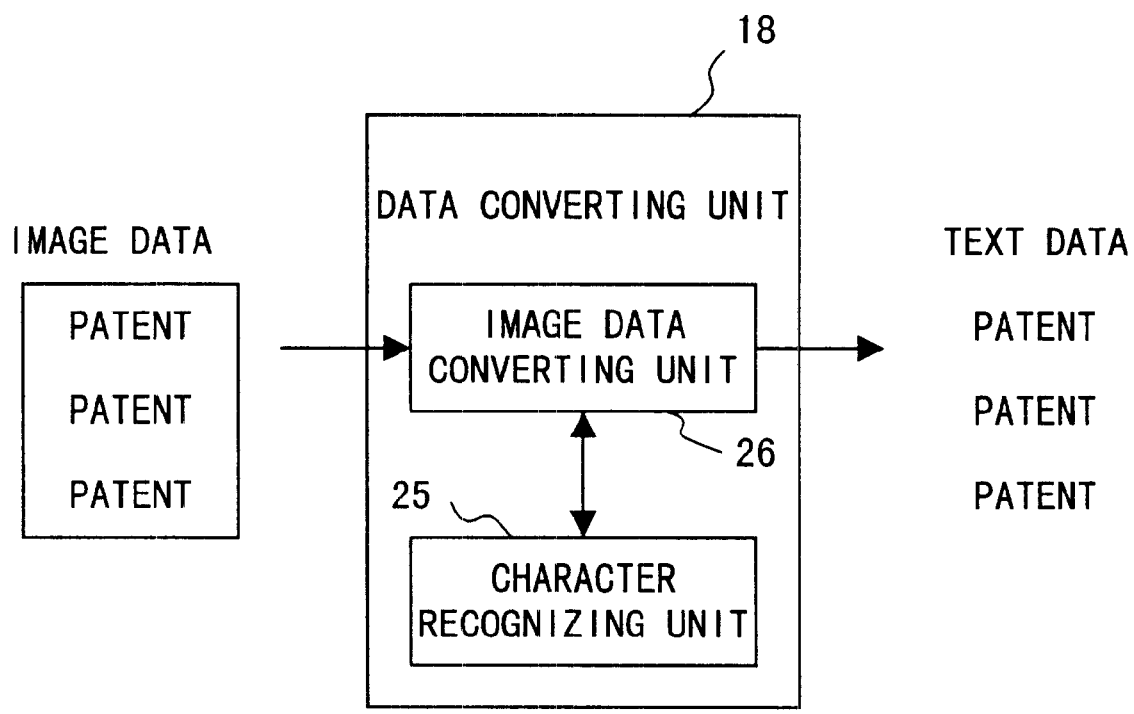
F I G. 6

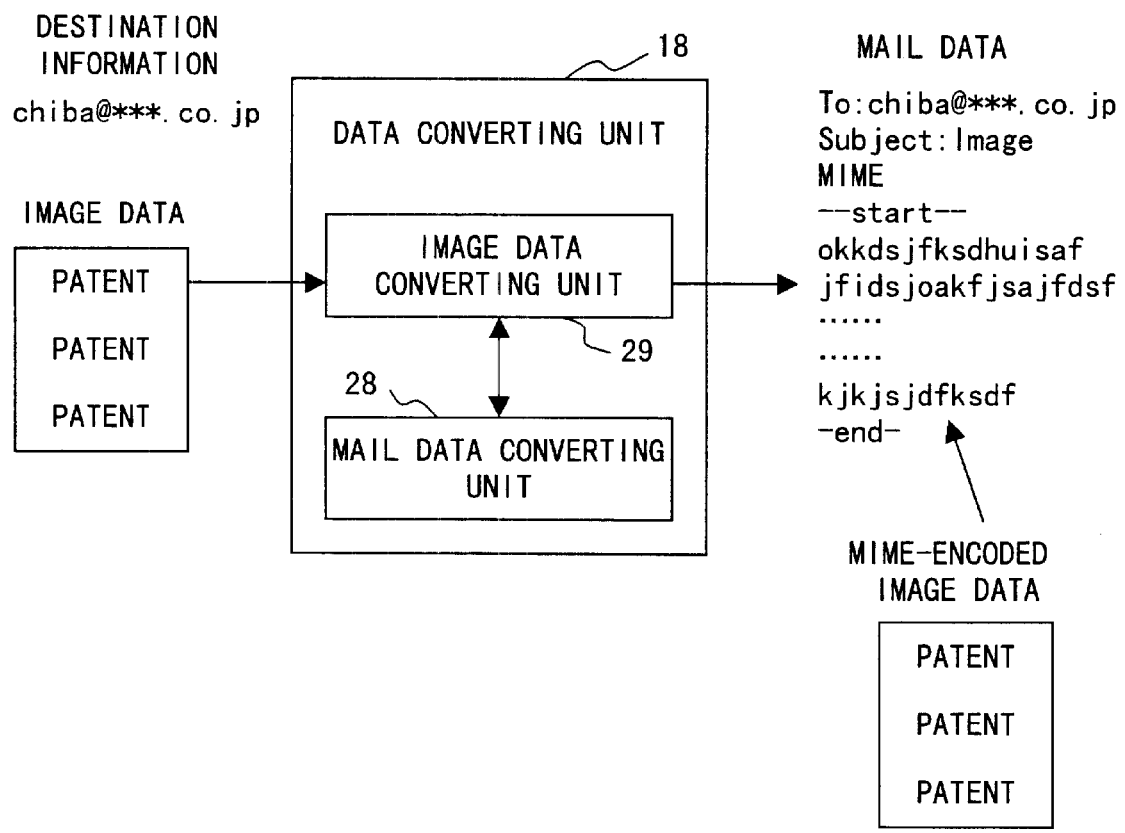
F I G. 7

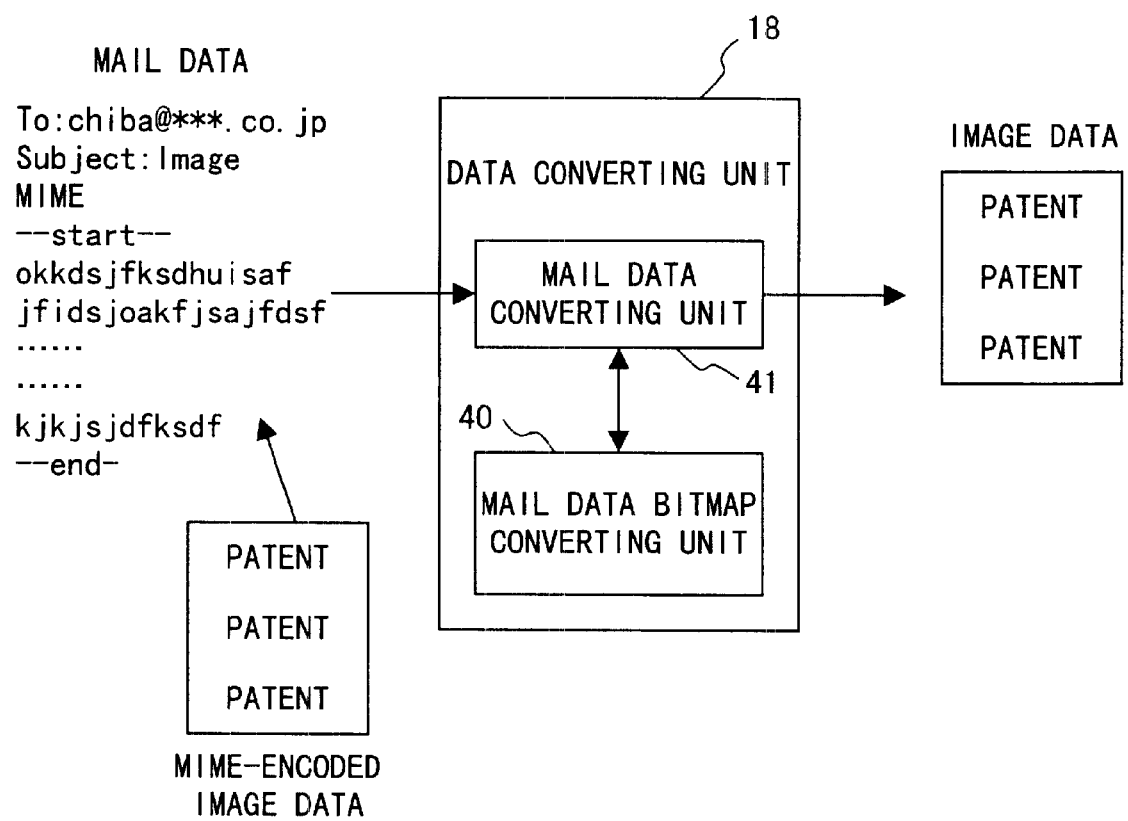
F I G. 1 2

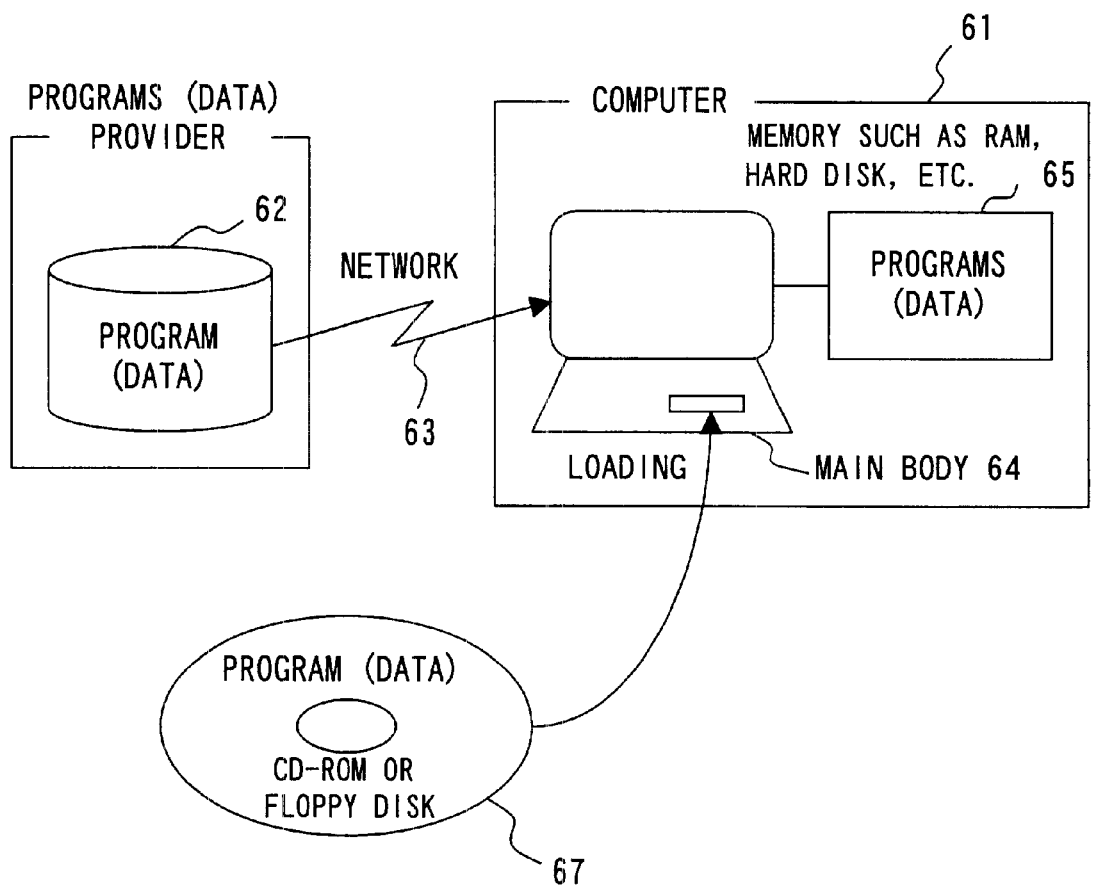
F I G. 1 6

IMAGE DATA CONVERTING SYSTEM AND A STORAGE MEDIUM THEREOF

BACKGROUND OF THE INVENTION

1. Field of the Invention

The present invention relates to an image reading/displaying system, and more particularly, to an image data converting system transferring image data read, for example, by an image reading device to an information processing device, and converting the data within the information processing device.

2. Description of the Related Art

With the popularization of portable information devices such as an electronic hand-held organizer, a personal computer, a personal word processor, etc., image data that is read by an image reading device such as an image scanner, etc. is transferred to an information processing device, and the data, for which the information processing device performs various processes, is used, as is often the case.

FIG. 1 is a block diagram exemplifying the conventional configuration of such an image reading system. In this figure, an image reading/displaying device 100 and an information processing device 101 are connected, for example, with a cable, so that a data transfer is made.

Data read by a reading unit on the side of the image reading/displaying device 100 is stored in an image data storing unit 103 by the control of a central processing unit 102, displayed on a display unit of the image reading/displaying device 100, and transferred from a data transferring unit 104 to the side of the information processing device 101.

The transferred data is received by a data transferring unit 107 on the side of the information processing device 101, and stored in an image data storing unit 106 by the control of a central processing unit 105. As a result, the image data can be displayed or used on the side of the information processing device 101.

For the data stored in the image data storing unit 106 on the side of the information processing device 101, for example, its type is converted, etc. depending on need. A conventional example of data conversion from image data into character data with character recognition, the following document can be cited.

Document 1) Japanese Laid-open Patent Publication No. 5-12484: Optical Character Recognition Device, Y. Kajino.

As a conventional technique for converting facsimile image data into mail data, the following document can be cited.

Document 2) Japanese Laid-open Patent Publication No. 10-32667 Communications Terminal Device, Yasumoto Additionally, as a data conversion technique for changing the resolution of output image data in an image scanner, the following document can be cited.

Document 3) Japanese Laid-open Patent Publication No. 5-108814 image Reading Device, Y. Ouchi Furthermore, a conventional example of data conversion for merging a plurality of pieces of image data obtained, for example, from a copier depending on need, and for generating image data for one page, the following document can be cited.

Document 4) Japanese Laid-open Patent Publication No. 5-122501 Image Processing Device and Image Processing Method, K. Yoshihara, M. Sakai, and K. Hirooka For example, in the conventional system explained by referencing FIG. 1 demands two-stage operations: form a user data read by the image reading/displaying device is displayed on the display unit, and the user makes a suitable selection from among the image data displayed on the display unit, and transmits the selected data to the side of the information processing device; and the user operates for a process for converting the image data stored in the image data storing unit 106 into text data is performed on the side of the information processing device.

The above described conventional examples of data conversion disclose normal data conversion techniques within a single device. With these techniques, however, it is impossible to perform operations that do not impose a load on a user. By way of example, in FIG. 1, a user must select image data stored in the image data storing unit 103 within the image reading/displaying device on 100 the side of the information processing device 101, and at the same time, the user must specify the type of data after being converted.

SUMMARY OF THE INVENTION

An object of the present invention is to provide an image data converting system with which a user selects, for example, image data stored on the side of an image reading/displaying device, and at the same time, the user specifies the type of transferred data after being converted, so that the operations required for converting data after the data transfer can be eliminated.

The image data converting system according to the present invention assumes a system configured by an image data obtaining device and an information processing device.

The information processing device comprises an operation instructing unit and a data converting unit.

The operation instructing unit receives, from a user, specification of image data to be transferred from the image obtaining device and specification of a conversion form of the image data, and instructs the side of the image data obtaining device to transfer the image data.

The data converting unit converts the image data transferred from the side of the image data obtaining device based on the conversion form received from the operation instructing unit. Examples of this image data conversion include conversion into text data, conversion into data in a mail form, conversion into data having a different resolution, conversion for merging a plurality of pieces of image data into one piece, etc.

The image data obtaining device comprises an image data transferring unit.

The image data transferring unit transfers the image data, which is specified by the user and instructed by the operation instructing unit, to the side of the information processing device.

Additionally, according to the present invention, not the information processing device but the image obtaining device may comprise the above described data converting unit so that converted data is transferred to the information processing device after image data is converted into a form based on user specification.

Furthermore, if the image data obtaining device is an image data obtaining/displaying device which comprises an image display capability, a data transfer is made from the information processing device to the image data obtaining/displaying device in addition to the data transfer from the image data obtaining/displaying device to the information processing device.

According to the present invention, image data is transferred and converted at the same time by simultaneously receiving the image data to be transferred and its conversion form, leading to a reduction in user workload and an improvement in user operability.

BRIEF DESCRIPTION OF THE DRAWINGS

FIG. 2A is a block diagram showing the principle of the configuration of an image data converting system according to a first preferred embodiment;

FIG. 2B is a block diagram showing the principle of the configuration of an image data converting system according to a second preferred embodiment;

FIG. 3 is a block diagram showing the configuration of an image data converting system according to the preferred embodiments;

FIG. 6 exemplifies the configuration of a data converting unit converting image data into text data in the first preferred embodiment;

FIG. 7 exemplifies the configuration of a data converting unit converting image data into data in a mail form in the first preferred embodiment;

FIG. 12 exemplifies the configuration of a data converting unit converting data in a mail form into image data in the second preferred embodiment;

FIG. 16 exemplifies storage media.

DESCRIPTION OF THE PREFERRED EMBODIMENTS

Figure 1:
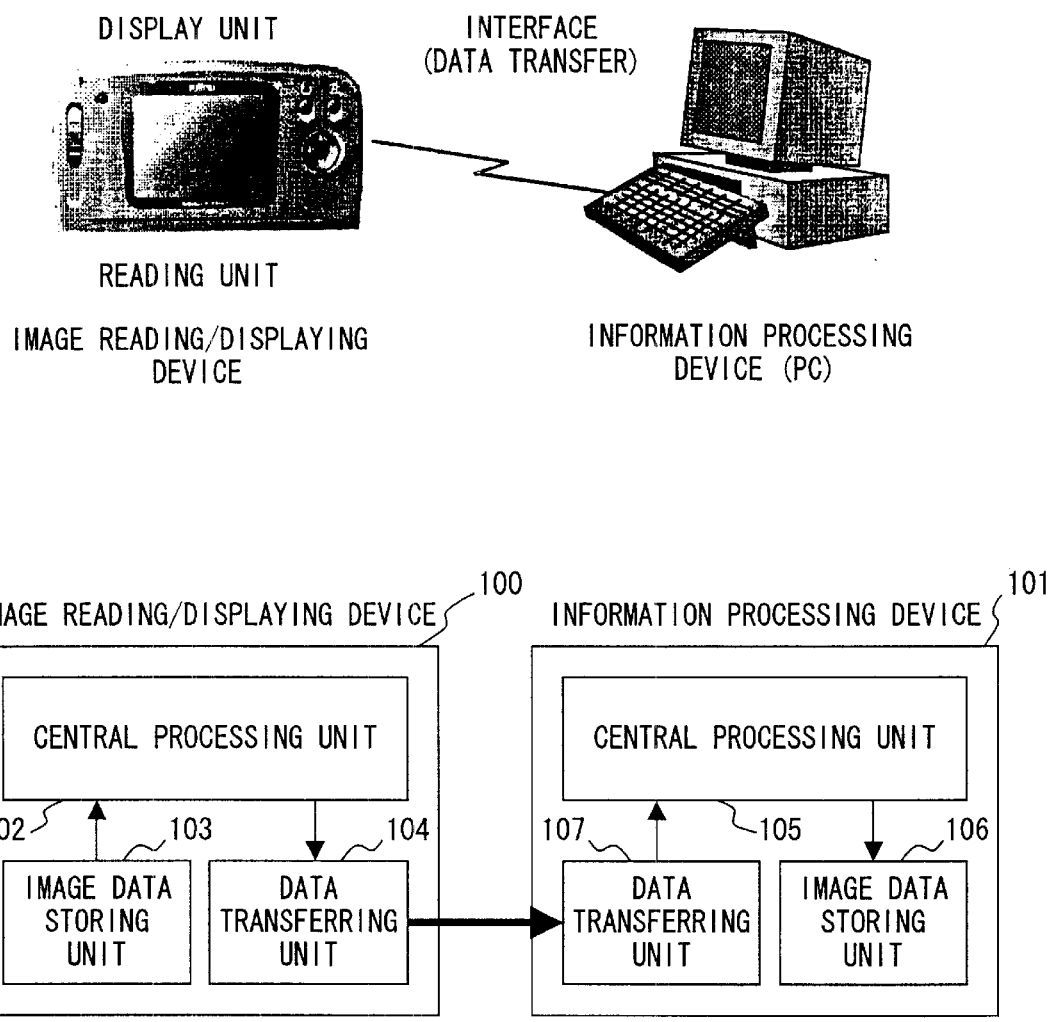
FIG. 1 shows the configuration of a conventional image reading/displaying system.

Principles of the configurations of image data converting systems according to preferred embodiments are described first.

FIGS. 2A and 2B are block diagrams showing the principles of the configurations of image data converting systems according to preferred embodiments, each of which is configured by an image data obtaining device and an information processing device.

FIG. 2A is a block diagram showing the configuration of an image data converting system when image data obtained on the side of an image data obtaining device is transferred to an information processing device.

In this figure, an information processing device 1 comprises an operation instructing unit 3 and a data converting unit 4. The operation instructing unit 3 receives, from a user, specification of image data to be transferred from an image data obtaining device 2, and specification of a data form after the image data is converted, such as a data type, etc., and instructs the image data obtaining device 2 to transfer the image data.

The operation instructing unit 3 displays, for example, the image data currently stored in the image data obtaining device 2 and its conversion method on the display unit of the information processing device 1 as a menu, and can receive from a user specification of image data to be transferred and specification of a data form after the image data is converted.

The data converting unit 4 converts image data transferred from the side of the image data obtaining device 2 according to the data type after being converted, which is received from a user and instructed by the operation instructing unit 3.

An image data transferring unit 5 on the side of the image data obtaining device 2 transfers to the side of the information processing device 1 the image data that the operation instructing unit 2 instructs to transfer.

As described above, according to this preferred embodiment, a user can select on the side of the information processing device 1, data to be transferred from the side of an image data obtaining device, and at the same time, the user can specify a data type after the image data is converted on the side of the information processing device 1. Namely, it becomes possible to simultaneously perform the operations explained by referencing FIG. 1: the first operation for selecting image data to be transferred, and the second operation for specifying a data type after the transferred image data is converted, which is to be performed after the data is transferred.

In this preferred embodiment, the data converting unit 4 can convert the image data transferred from the side of the image data obtaining device 2 into text data by performing character recognition, into mail data including image data, or into the image data a resolution of which is different, and can also convert and merge a plurality of pieces of image data into one image data as occasion demands.

In the data converting system according to the present embodiment, the data converting unit 4 may be arranged not on the side of the information processing device 1 but on the side of the image data obtaining device 2, and the data converting unit 4 can also transfer data to the information processing device 1 after the data conversion corresponding to an instruction from the operation instructing unit 3 is performed.

FIG. 2B is a block diagram showing the principle of the configuration of a second preferred embodiment to be described later, that is, an image data converting system which transfers data stored on the side of an information processing device 1 to the side of an image data obtaining/displaying device 6, and can display the transferred data on a display unit of the image data obtaining/displaying device 6. In this figure, bidirectional image transfer is made including the transfer of image data obtained by the image data obtaining/displaying device 6 to the side of the information processing device 1.

In FIG. 2B, the information processing device 1 comprises an operation instructing unit 3, a data converting unit 4, and a first data transferring unit 9.

The operation instructing unit 3 receives, from a user, specification of data to be transferred between the information processing device 1 and the image data obtaining/displaying device 6, and specification such as a data type after the image data is converted.

The data converting unit 4 converts data into image data when the data is transferred to the side of the image data obtaining/displaying device 6, and also converts transferred image data into image data the type of which is specified by a user when the data is transferred from the side of the image data obtaining/displaying device 6. Additionally, the first data transferring unit 9 transfers data converted into image data to the side of the image data obtaining/displaying device 6.

A second data transferring unit 7 of the image data obtaining/displaying device 6 transfers image data to the side of the information processing device 1 according to an instruction from the operation instructing unit 3, namely, an instruction that a user specifies for the image data to be transferred. A display unit 8 displays image data when the image data is inversely transferred from the side of the information processing device 1.

In this preferred embodiment, the data converting unit 4 shown in FIG. 2B can perform bidirectional conversion between text and image data, bidirectional conversion between mail and image data, conversion of the resolution of image data, or merging and partitioning conversion of image data.

Furthermore, an image data transferring device according to a preferred embodiment may be configured to transfer image data between an external device and the device itself, and to comprise an operation instructing unit, a data converting unit, and a data transferring unit.

The operation instructing unit receives, from a user, specification of data to be transferred between an external device and the image data transferring device itself, and specification of the form of data after being converted from image data, etc. When the operation instructing unit is to receive data from the side of an external device, it instructs the external device to transfer the image data specified by the user.

The data converting unit converts data into image data when the data is transferred to the side of the external device, and converts the form of transferred image data into data the form of which is specified by the user, when the image data is transferred from the side of the external device. The data transferring unit transfers the data converted into image data to the side of the external device.

Furthermore, used as a storage medium utilized by a computer that transfers image data between an external device and the computer itself is a computer-readable portable storage medium on which is recorded a program for causing the computer to execute a process, the processes comprising: receiving, from a user, specification of data to be transferred between the external device and the computer itself, specification of the type of the data after being converted from the image data; instructing the side of the external device to transfer the image data specified by the user, when the image data is to be received from the side of the external device; and converting the image data transferred from the external device into image data the type of which is specified by the user, or the process comprising: converting data specified by a user into image data when the image data is to be transferred to the side of the external device; and transferring the converted image data to the side of the external device.

With the image data transferring device according to this preferred embodiment, a user can simultaneously specify data to be transferred, and also the form of the after being converted, such as a data form, resolution, etc., when the data is transferred from an image reading device to an information processing device.

Next, the conventional image reading system shown in FIG. 1 is further described before the image data transferring device according to this preferred embodiment is explained in detail. The conventional system shown in FIG. 1 (Japanese Laid-open Patent Publication No. 20000-201261) is characterized in that the image reading/displaying device 100 includes the image data storing unit 103, which is recognized as an external storage device if it is viewed from the side of the information processing device 101.

The image data storing unit 103 shown in FIG. 1 stores the image data read by the image reading/displaying device 100, etc. The image data storing unit 103 has a storage capacity which is large enough to store a plurality of pieces of image data if the image read by one image read operation is assumed to be one image.

As the image data storing unit 103, nonvolatile or volatile semiconductor memory, magnetic disk, etc. are used. As a semiconductor memory, DRAM (Dynamic Random Access Memory), EEPROM (Electrically Erasable Programmable Read-Only Memory), flash memory, etc., are used. When a semiconductor memory is used, an image data memory device configured by stacking a plurality of semiconductor memories is used to reduce a mounting space.

When an image is read, the image reading/displaying device is moved so that its image reading surface contacts an original in a state instructed by a user. Read data is then stored in the image data storing unit 103, and at the same time, the image is displayed on the display unit.

After the image is read, the user connects the data transferring unit 104 of the image reading/displaying device 100 and the data transferring unit 107 of the information processing device 101 with a cable. With this connection, an early-stage communication is made between the data transferring unit 104 of the image reading/displaying device 101 and the data transferring unit 107 of the information processing device 101 according to a predetermined communications protocol. The central processing unit 105 of the information processing device 101 recognizes the image data storing unit 103 as an external storage device via the data transferring unit 107, the cable, and the data transferring unit 104 of the image reading/displaying device 100.

Next, when the user enters a read command, for example, via the keyboard of the information processing device 101, the central processing unit 105 accesses the image data storing unit 103 via the data transferring unit 107, the cable, and the data transferring unit 104, and reads the stored image data. Then, the central processing unit 105 stores the read data in the image data storing unit 106, and displays the image on the display unit based on the stored data.

As described above, the conventional image reading system shown in FIG. 1 adopts a configuration that enables an access from an external device to the image data storing unit 103 by the data transferring units of the image reading/displaying device and the external device, so that the image data storing unit 103 is allowed to comprise the capability of an external storage device if it is viewed from the external device.

Next, preferred embodiments according to the present invention will be described.

FIG. 3 is a block diagram showing the configuration of an image data converting system according to a first preferred embodiment. Likewise the conventional system exemplified in FIG. 1, an image reading device 10 and an information processing device 11 are connected in FIG. 3. The image reading/displaying device 10 includes a central processing unit 12, a first data storing unit 13, and a data transferring unit 14 in a similar manner as in FIG. 1. And the information processing device 11 includes a data converting unit 18, an operation instructing unit 19, and a user interface (UI) display unit 20 in addition to a central processing unit 15, a second data storing unit 16, and a data transferring unit 17 in a similar manner as in FIG. 1.

The data transfer between the data transferring unit 14 of the image reading/displaying device 10 and the data transferring unit 17 of the information processing device 11 is fundamentally made as a bidirectional communication. However, the first preferred embodiment targets only the data transfer from the image reading/displaying device 10 to the information processing device 11. Namely, the first preferred embodiment is explained by assuming that, for instance, image data read on the side of the image reading/displaying device 10 and stored in the first data storing unit 13 is transferred to the information processing device 11.

The data converting unit 18 within the information processing device 11 converts image data transferred from the side of the image reading/displaying device 10, for example, into data of a different type such as text data, mail data, etc. Data stored on the side of the image reading/displaying device 10 is image data such as bitmap data, etc. Image data is transferred between the image reading/displaying device 10 and the information processing device 11 as data in a form such as bitmap. The data converting unit 18 converts the image data into data the type of which is required on the side of the information processing device 11.

When a user specifies image data to be transferred among the image data stored in the data storing unit 13 within the image reading/displaying device 10, and also specifies, for example, a data form into which the transferred data is converted, the operation instructing unit 19 within the information processing device 11 instructs the image reading/displaying device 10 to transfer the specified image data, and also instructs the data converting unit 18 to convert the transferred into the specified data form according to the specification. A user selection of image data and specification of the type of data after being converted are made via the user interface (UI) display unit 20.

Figure 4:
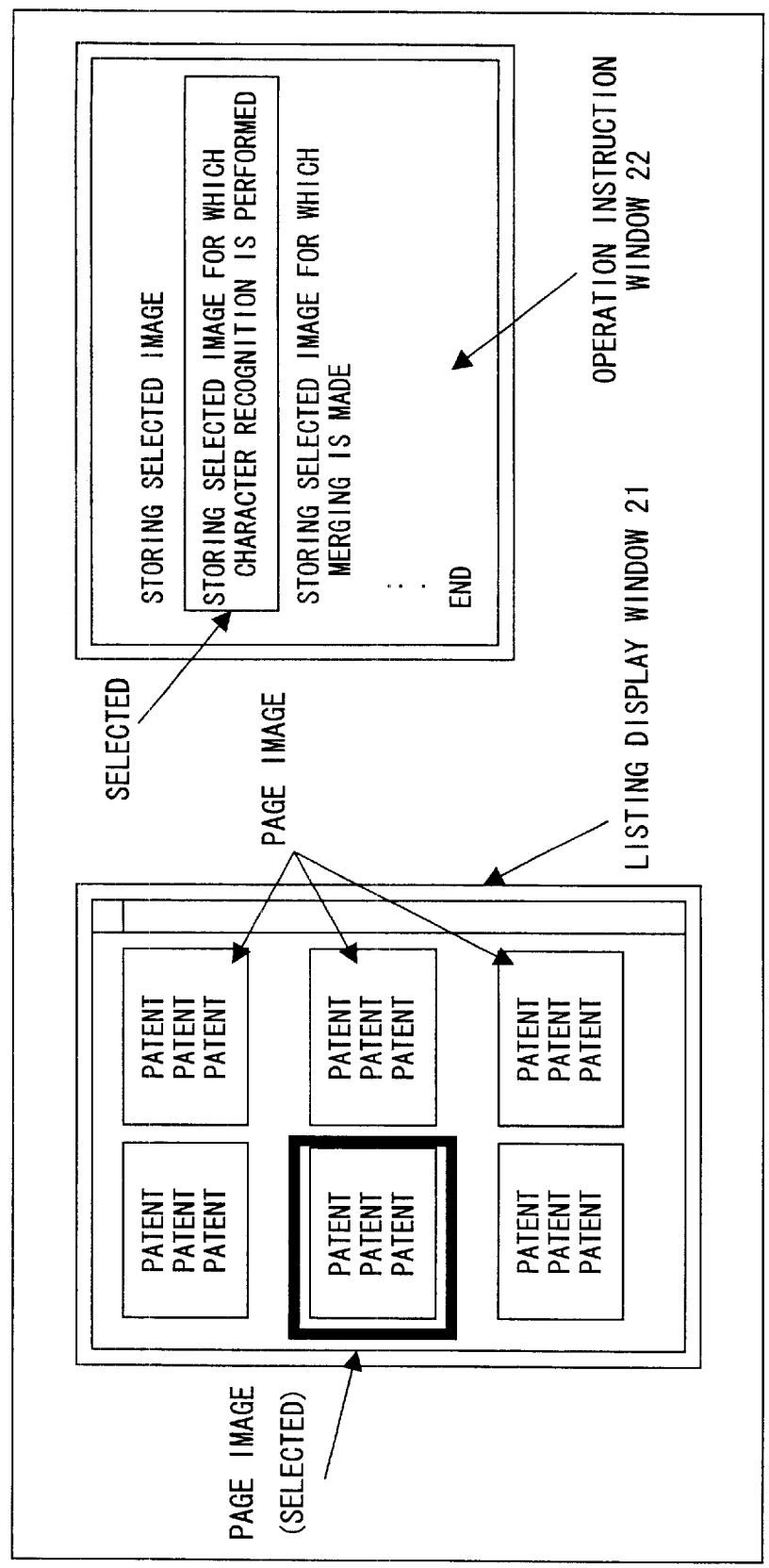
FIG. 4 exemplifies a display of a user interface screen in the first preferred embodiment.

FIG. 4 exemplifies a UI screen displayed by the UI display unit 20.

The left side of this figure shows a listing display window 21 for selecting a process target from among the images stored in the first data storing unit 13 within the image reading/displaying device 10. Image data for 6 pages is displayed in the listing display window shown in this figure. The page image that a user selects, for example, with a mouse is indicated by a thick black frame on the screen.

The right side of FIG. 4 shows an operation instruction window 22 for specifying a process for the image selected in the listing display window 21, a data conversion form, etc. In this figure, a process for performing character recognition for the selected image, for converting the image data into character (text) data, and for storing the converted data in the second data storing unit 16 is selected by the user.

Figure 5:
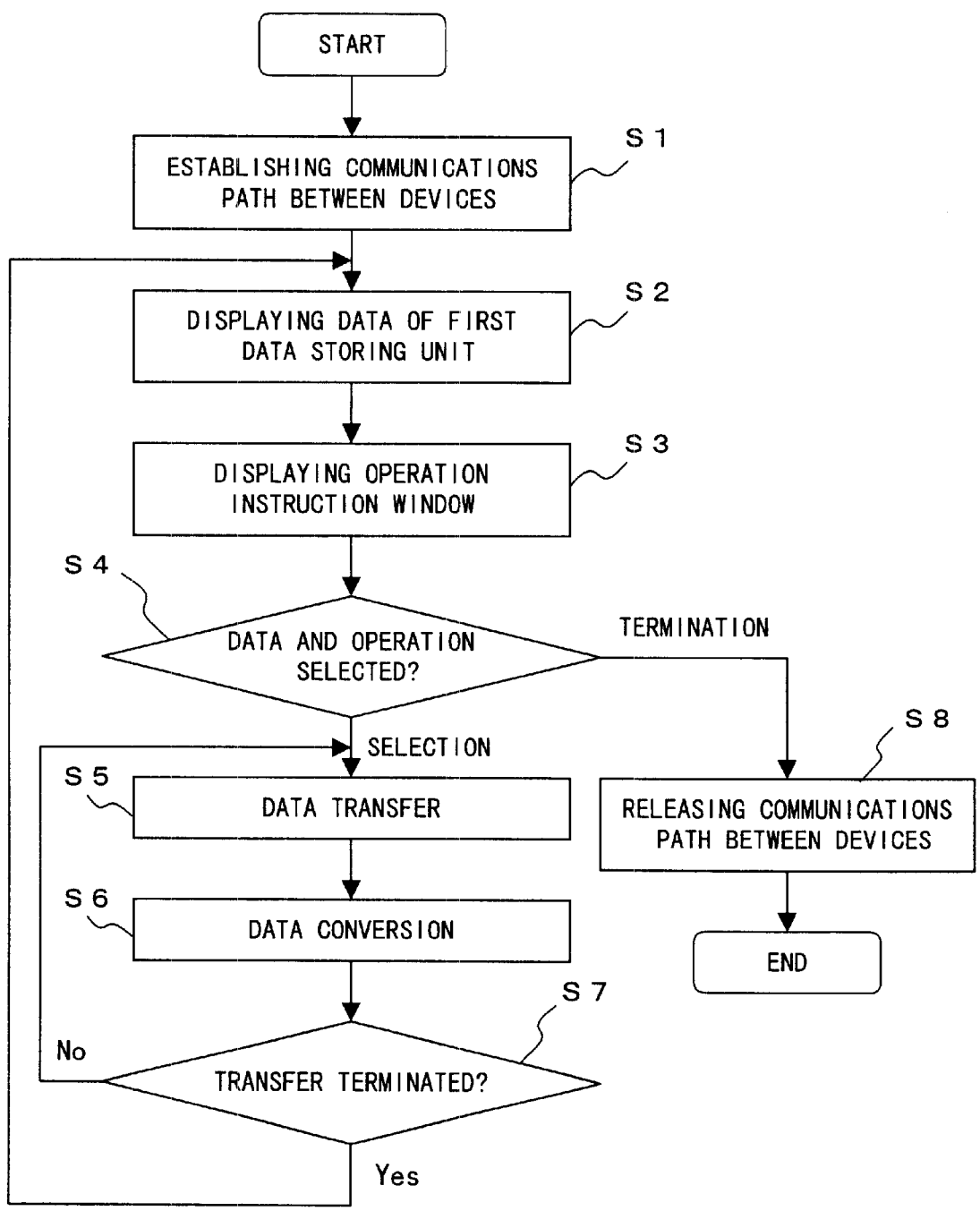
FIG. 5 is a flowchart showing the flow of an image data converting system according to the first preferred embodiment.

FIG. 5 is a flowchart showing the process of the data converting system according to the first preferred embodiment. Once the process is started in this figure, a communications path between devices, namely, a communications path between the data transferring unit 14 of the image reading/displaying device 10 and the data transferring unit 17 of the information processing device 11 is established to make an early-stage communication, etc. in step S1. Then, in step S2, data stored in the first data storing unit 13 is displayed on the display of the information processing device 11 by the UI display unit 20. In step S3, an operation instruction window 22 is displayed on the same screen.

In step S4, it is determined whether or not image data and its process such as the form of data after being converted are selected. If they are selected, the data is transferred from the image reading/displaying device 10 to the information processing device 11 in step S5. In step S6, the transferred data is converted by the data converting unit 18. In step S7, whether or not the data transfer has completed. If the data transfer has not completed yet, the operations in and after step S5 are repeated.

If it is determined that the data transfer has been completed in step S7, the process goes back to step S2 in which the image data is again displayed in the listing display window. Then, the operation instruction window is displayed in step S3, and it is determined whether or not data and its process are selected in step S4. If a user further instructs a data transfer, the operations in and after step S5 are repeated. However, if no image data to be transferred exists, termination is selected in the operation instruction window. As a result, the communications path between the devices is released in step S8 and the process is terminated.

FIGS. 6 through 9 exemplify the configurations of the data converting unit 18 shown in FIG. 3.

The data converting unit 18 shown in FIG. 6 converts image data into text data. A character recognizing unit 25 performs character recognition for the image data read by the image reading/displaying device 10, for example, bitmap data of a patent specification, and an image data converting unit 26 converts the bitmap data into text (character) data as the patent specification. This is a configuration optimum for an information processing device that performs a text-base process, such as a word processor, etc. With this configuration, converted data can be used unchanged.

FIG. 7 exemplifies the configuration of the data converting unit converting image data into mail data.

A mail data converting unit 28 and an image data converting unit 29 convert image data read by the image reading/displaying device 10 and pre-stored destination information into mail data. The image data is converted into text data so that the image data can be attached to mail and transferred. This conversion into text information is performed by MIME (Multipurpose Internet Mail Extensions) encoding for multimedia e-mail, which is one of the Internet protocols. Data between the start and the end of the mail data on the right side of FIG. 7 corresponds to image data. Data after being converted can be transmitted via a modem.

Figure 8:
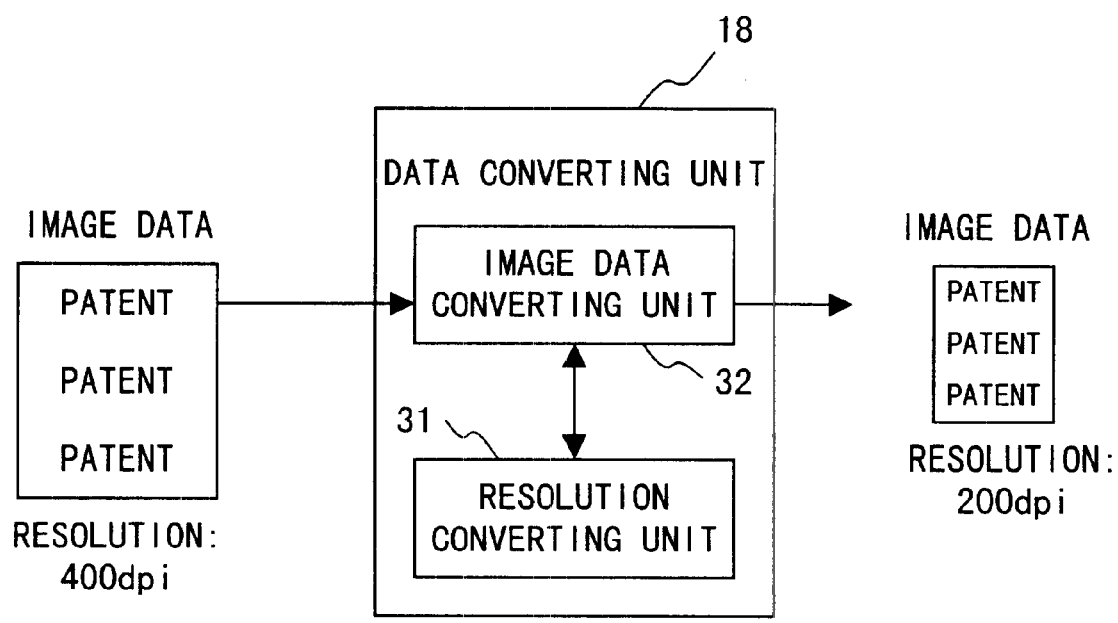
FIG. 8 exemplifies the configuration of a data converting unit converting image data into image data the resolution of which is changed in the first preferred embodiment.

FIG. 8 exemplifies the configuration of a data converting unit converting the resolution of image data.

If the resolution of image data transferred from the image reading/displaying device 10, that is, 400 dpi does not agree with the resolution 200 dpi used on the side of the information processing device 11, the resolution conversion is performed by the resolution converting unit 31 and the image data converting unit 32. The converted image data is then used on the side of the information processing device 11, so that the display suitable for that device can be made.

Figure 9:
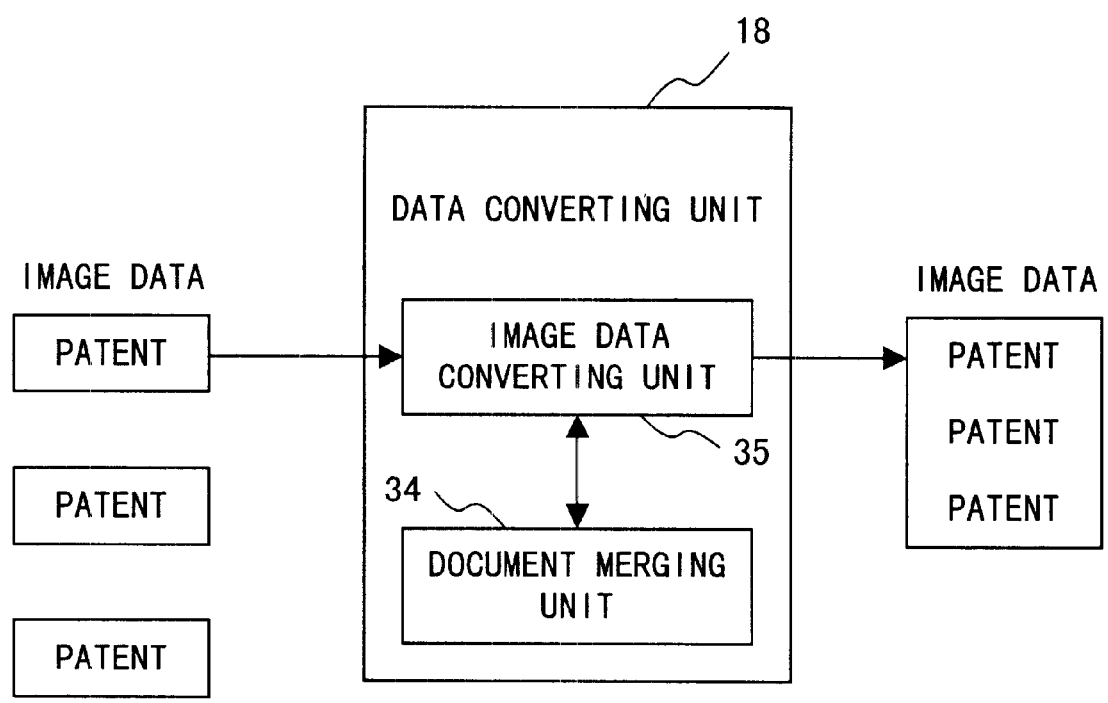
FIG. 9 exemplifies the configuration of a data converting unit converting a plurality of pieces of image data into one image data in the first preferred embodiment.

FIG. 9 shows the configuration in which, for example, image data for a plurality of pages, which are transmitted from the side of the image reading/displaying device, are suitably merged, and converted, for example, into image data for one page. Images are merged and converted by a document merging unit 34 and an image data converting unit 35, so that an optimum display can be implemented on the side of the information processing device.

Additionally, the image data converting unit 18 shown in FIG. 9 is used for image data for one page, which is captured by multiple times and stored as a plurality of pieces of image data on the side of the image reading/displaying device, whereby the image data can be handled as one image data on the side of the information processing device.

Figure 10:
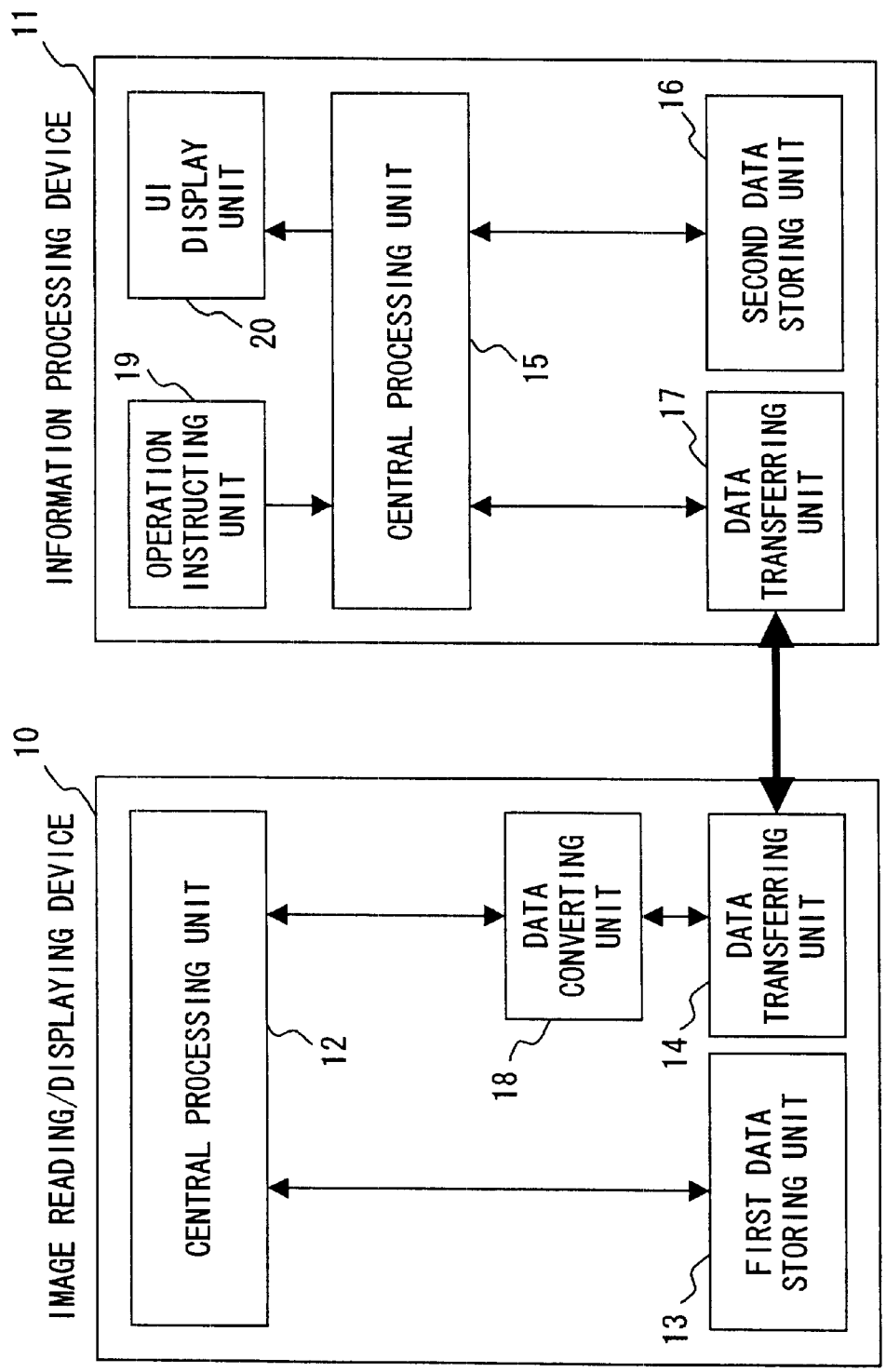
FIG. 10 exemplifies the configuration of a data converting system comprising a data converting unit on the side of an image reading/displaying device.

FIG. 10 is a block diagram showing the configuration of an image data converting system, which is different from that shown in FIG. 3. Unlike the configuration shown in FIG. 3, the data converting unit 18 is arranged not on the side of the information processing device 11, but within the image reading/displaying device 10. Therefore, image data is converted within the image reading/displaying device 10, and the converted image data is transmitted from the data transferring unit 14 to the side of the information processing device 11. For example, the conversion into mail data, which is explained by referencing FIG. 7, is made within the image reading/displaying device 10, whereby the side of the information processing device 11 can transfer transmitted data to the Internet via a modem, etc. unchanged. In this case, also the UI display unit 20 may be arranged on the side of the image reading/displaying device 10, and a user instruction for specifying an operation may be received on the side of the image reading/displaying device 10.

Additionally, the amount of data transferred from the image reading/displaying device 10 to the information processing device 11 can be reduced by arranging the data converting unit 18 on the side of the image reading/displaying device 10, and by performing the resolution conversion from 400 dpi to 200 dpi, which is explained by referencing FIG. 8.

The first preferred embodiment is explained based on the assumption that data stored within the image reading/displaying device is transferred to the side of the information processing device. However, the data conversion according to the present embodiment can be implemented if the image reading/displaying device does not comprise a memory for storing read data. Any reading device is available as long as the device can transfer read data to the side of the information processing device 11 according to an operation instruction from the side of the information processing device 11. By way of example, even an image reading device which does not comprise a display unit and memory, such as an image scanner, can be used. Furthermore, the above provided explanation assumes that image data in a bitmap data form is transferred to the information processing device 11. However, image data to be transferred is not limited to bitmap data. For example, transferred image data may be data captured by an image device such as a digital camera.

A second preferred embodiment according to the present invention is explained next.

The configuration of the image data converting system according to the second preferred embodiment is the same as that shown in FIG. 3 or FIG. 10. However, the second preferred embodiment has a difference in a point that, for example, data stored in the second data storing unit 16 is converted into image data by the data converting unit 18, transferred to the image reading/displaying device 10, and stored in the first data storing unit 13 or displayed on the display unit of the image reading/displaying device.

FIGS. 11 through 14 exemplify the configuration of the data converting unit 18 according to the second preferred embodiment.

Figure 11:
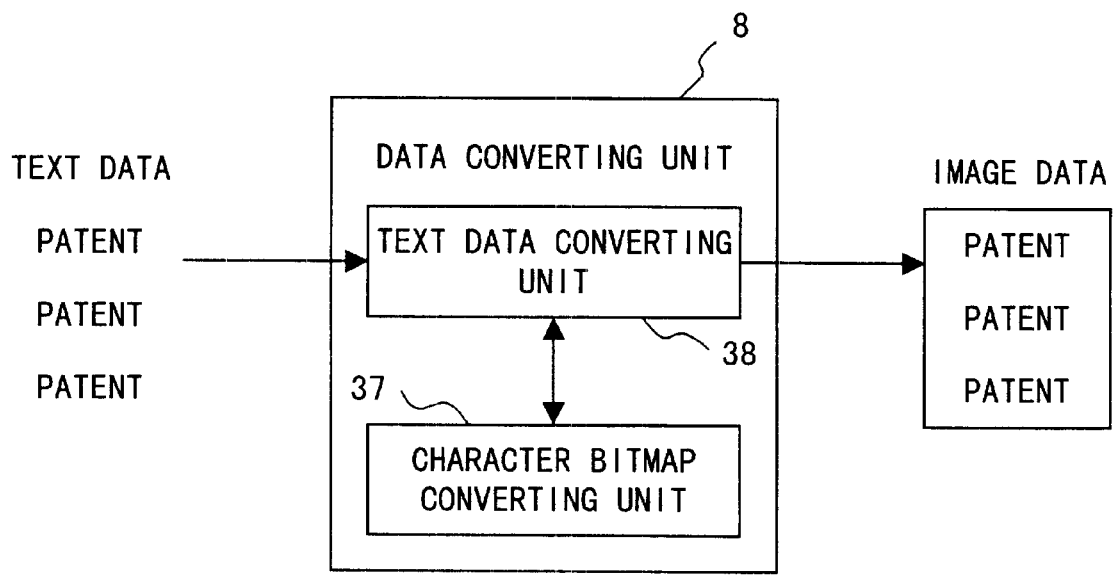
FIG. 11 exemplifies the configuration of a data converting unit converting text data into image data in the second preferred embodiment.

Inversely to FIG. 6, a character bitmap converting unit 37 and a text data converting unit 38 convert text data into image data, namely, bitmap data, and the converted data is transferred to the image reading/displaying device 10, so that the data can be managed and displayed similar to read data on the side of the image reading/displaying device 10 in FIG. 11.

FIG. 12 exemplifies the configuration of the data converting unit converting mail data into image data, inversely to FIG. 7.

A mail data bitmap converting unit 40 and a mail data converting unit 41 convert mail data received by the information processing device 11 into image data, and the converted data is transferred to the image reading/displaying device, so that the mail can be displayed on the side of the image reading/displaying device.

Figure 13:
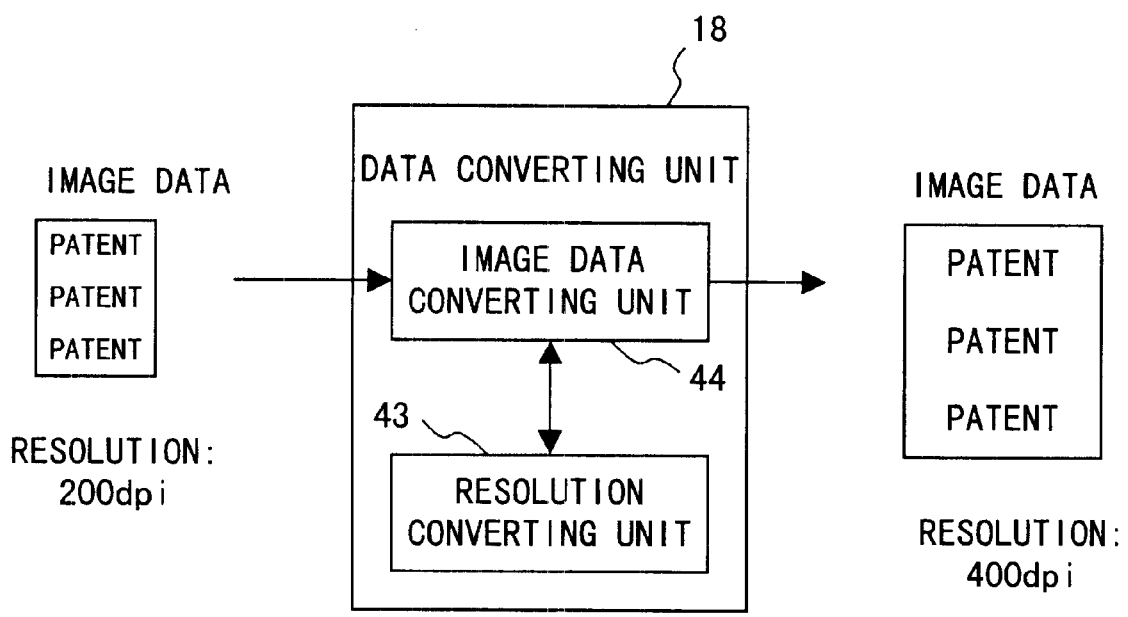
FIG. 13 exemplifies the configuration of a data converting unit converting image data into image data the resolution of which is changed in the second preferred embodiment.

FIG. 13 exemplifies the configuration of the data converting unit performing resolution conversion, inversely to FIG. 8.

A resolution converting unit 43 and an image data converting unit 44 convert, for instance, image data having a 200-dpi resolution stored on the side of the information processing device 11 into image data having a 400-dpi resolution, and the converted image data is transferred to the image reading/displaying device 10, so that the image can be suitably displayed on the image reading/displaying device 10.

Figure 14:
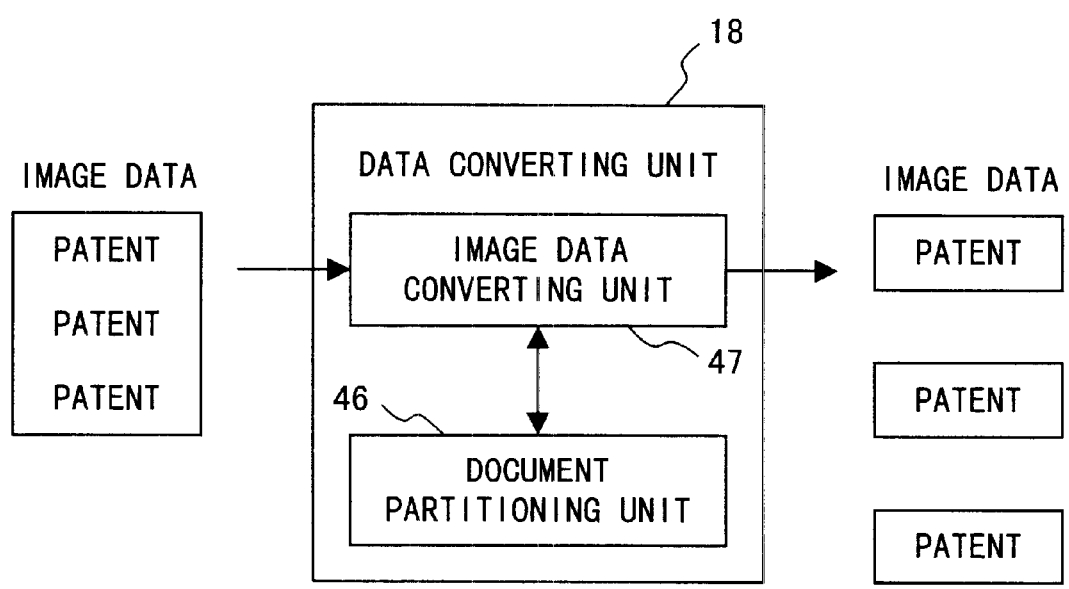
FIG. 14 exemplifies the configuration of a data converting unit converting one image data into a plurality of pieces of image data in the second preferred embodiment.

FIG. 14 exemplifies the configuration of the data converting unit partitioning, inversely to FIG. 9, for example, image data for one page into a plurality of pieces image data of a size suitable for being displayed on the side of the image reading/displaying device 10, and transferring the partitioned image data. Image data partitioned by a document partitioning unit 46 and an image data converting unit 47 are transferred to the image reading/displaying device 10, so that a suitable image display is implemented.

Additionally, the image data converting unit 18 shown in FIG. 14 partitions image data into data of a size optimum for being displayed on the image reading/displaying device, so that the image data can be displayed and managed similar to normal image on the side of the image reading/displaying device.

Lastly, loading of a program for implementing the present embodiment into a computer is explained. For instance, in FIG. 3, the information processing device 11 is implemented by a general computer. Also an image reading device can be recognized as one type of a computer system comprising an image reading mechanism by making a control program changeable.

Figure 15:
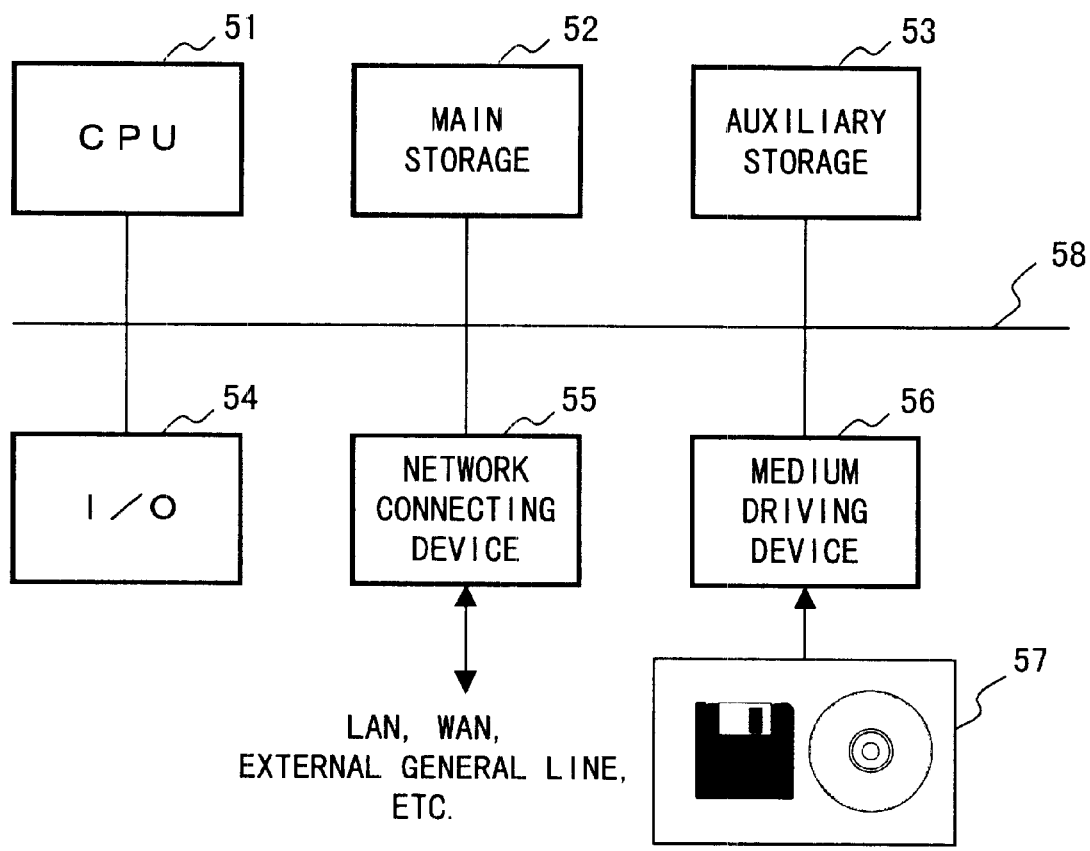
FIG. 15 shows the system environment of a computer used in the preferred embodiments.

FIG. 15 shows the system environment of a computer used in the preferred embodiments.

The computer system shown in this figure comprises a CPU 51, a main storage device 52, an auxiliary storage device 53, input/output devices such as a display, a keyboard, etc., a network connecting device 55 such as a modem, etc., and a medium reading device 56 reading the contents stored onto a portable storage medium such as a disk, a magnetic tape, etc. These constituent elements are interconnected by a bus 58.

With the computer system shown in FIG. 15, a program and data, which are stored onto a storage medium 57 such as a magnetic tape, a floppy disk, a CD-ROM, an MO, etc., are read by the medium reading device 56, and downloaded into the main storage device 52 or the auxiliary storage device 53 such as a hard disk. The CPU 51 executes the program and data, whereby the processes performed on the sides of the image reading/displaying device and the information processing device according to the preferred embodiments are implemented in a software manner.

Additionally, in the computer system shown in FIG. 15, application software is sometimes replaced by using the storage medium 57 such as a floppy disk, etc. Therefore, the present invention is not limited to an information transmitting system or method, and may be configured as a computer-readable storage medium 57 for causing a computer to execute the above described capabilities of preferred embodiments according to the present invention, when being used by the computer.

In this case, the storage medium includes, for example, a portable storage medium 66 such as a CD-ROM, a floppy disk (an MO, a DVD, a removal hard disk, etc. are available), which is insertable/removable into/from the medium driving device 67, storage means (database, etc.) 62 within an external device (a server, etc.) connected via a network line 63; a memory (a RAM, a hard disk, etc.) 65 within the main body 64 of the computer 61, etc., as shown in FIG. 6. The program stored onto the portable storage medium 66 or in the storage means 62 are loaded into the memory 65 within the main body 64, and executed.

The preferred embodiments according to the present invention are explained earlier by assuming that an image reading/displaying device and an information processing device are connected with a cable to make a data transfer. However, a data communication may be wirelessly implemented with this data transfer method.

As wireless data communications, communications types such as a microwave communication, an optical communication, an infrared ray communication, etc. are available. If the microwave communication is used, an antenna and a transmitting/receiving unit for transmitting/receiving microwaves may be arranged as a replacement of a data converting unit, and an antenna and a transmitting/receiving unit may be arranged also on a computer side. With this configuration, a computer and a first data storing unit of an image reading/displaying device are wirelessly connected via a microwave line.

Additionally, if the optical communication is used, an optical transmitting/receiving unit having a reception element for receiving light may be arranged in both of an information processing device and an image reading/displaying device as a replacement of a data transferring unit.

Furthermore, if the infrared ray communication is used, an infrared ray transmitting/receiving unit for transmitting/receiving an infrared ray may be arranged in the two devices as a replacement of a data transferring unit.

As described above in detail, according to the present invention, image data is transferred and converted by simultaneously receiving, from a user, both of specification of data to be transferred and specification of a data type after the image data is converted, for example, on the side of an information processing device in an image data converting system transferring image data between an image reading/displaying device which reads/displays image data and the information processing device, thereby reducing user operations. This greatly contributes to an improvement in user operability of an image reading/displaying system.

What is claimed is:

1. An image data converting system configured by an image data obtaining device and an information processing device, wherein:

the information processing device comprises
an operation instructing unit receiving, from a user, specification of image data to be transferred from the image data obtaining device and specification of a conversion form of the image data, and instructing the image data obtaining device to transfer the image data,
a data converting unit converting the image data transferred from the side of the image data obtaining device based on the conversion form received from the user; and
the image data obtaining device comprises
an image data transferring unit transferring to the information processing device the image data that is specified by the user and instructed by said operation instructing unit.

2. The image data converting system according to claim 1, wherein
said data converting unit converts the image data transferred from the side of the image data obtaining device into data in a text form.

3. The image data converting system according to claim 1, wherein
said data converting unit converts the image data transferred from the image data obtaining device into data in a mail form.

4. The image data converting system according to claim 1, wherein
said data converting unit converts the image data transferred from the image data obtaining device into image data a resolution of which is different.

5. The image data converting system according to claim 1, wherein
said data converting unit merges and converts a plurality of pieces of image data transferred from the image data obtaining device.

6. An image data converting system configured by an image data obtaining device and an information processing device, wherein:

the information processing device comprises
an operation instructing unit receiving, from a user, specification of image data to be transferred from the image data obtaining device and specification of a data form after the image data is converted, and instructing the image data obtaining device to convert the image data into the specified data form and to transfer the data after being converted; and
the image data obtaining device comprises
a data converting unit converting image data based on an instruction from said operation instructing unit, and
a data transferring unit transferring a data after being converted by the data converting unit to the information processing device.

7. An image data converting system configured by an image data obtaining/displaying device and an information processing device, wherein:

the information processing device comprises
an operation instructing unit receiving, from a user, at least one of specification of data to be transferred between the image data obtaining/displaying device and the information processing device itself, and specification of a data form after the image data, which is transferred from the image data obtaining/displaying device, is converted,
a data converting unit converting the data into image data when the data is transferred to the image data obtaining/displaying device, and converting image data into the data form after being converted when the image data is transferred from the image data obtaining/displaying device, and a first data transferring unit transferring the data converted into the image data to the image data obtaining/displaying device; and the image data obtaining/displaying device comprises a second data transferring unit transferring image data based on the specification of the data to be transferred, which is received from the user by said operation instructing unit, when the image data is transferred to the information processing device, and a display unit displaying the image data transferred from the side of the information processing device.

8. The image data converting system according to claim 7, wherein when data is transferred to the image data obtaining/displaying device, said data converting unit converts text data into image data.

9. The image data converting system according to claim 7, wherein when data is transferred to the image data obtaining/displaying device, said data converting unit converts mail data into image data.

10. The image data converting system according to claim 7, wherein when data is transferred to the image data obtaining/displaying device, said data converting unit converts image data into image data a resolution of which is different.

11. The image data converting system according to claim 7, wherein when image data is transferred to the image data obtaining/displaying device, said data converting unit partitions and converts image data.

12. An image data transferring device transferring image data between an external device and the image data transferring device itself, comprising:

an operation instructing unit receiving, from a user, at least one of specification of data to be transferred between the external device and the image data transferring device itself, and specification of a conversion form of image data, and instructing the external device to transfer the data to be transferred, which is specified by the user, when the data is received from the external device;

a data converting unit converting data into image data when the data is transferred to the external device, and converting transferred image data into data in the conversion form when the data is transferred from the external device; and a data transferring unit transferring the data converted into the image data to the external device.

13. An image data converting system configured by an image data obtaining device and an information processing device, wherein:

the information processing device comprises operation instructing means for receiving, from a user, specification of image data to be transferred from the image data obtaining device and specification of a conversion form of the image data, and for instructing the image data obtaining device to transfer the image data, data converting means for converting the image data transferred from the image data obtaining device based on the conversion form received from the user; and the image data obtaining device comprises image data transferring means for transferring to the information processing device the image data that is specified by the user and instructed by said operation instructing means.

14. An image data converting system configured by an image data obtaining/displaying device and an information processing device, wherein the information processing device comprises operation instructing means for receiving, from a user, at least one of specification of data to be transferred between the image data obtaining/displaying device and the information processing device itself, and specification of a data form after the image data, which is transferred from the image data obtaining/displaying device, is converted, data converting means for converting the data into image data when the data is transferred to the image data obtaining/displaying device, and for converting image data into the data form after being converted when the image data is transferred from the image data obtaining/displaying device, and first data transferring means for transferring the data converted into the image data to the image data obtaining/displaying device; and the image data obtaining/displaying device comprises second data transferring means for transferring image data based on the specification of the data to be transferred, which is received from the user by said operation instructing means, when the image data is transferred to the information processing device, and display means for displaying the image data transferred from the information processing device.

15. An image data transferring device transferring image data between an external device and the image data transferring device itself, comprising:

operation instructing means for receiving, from a user, at least one of specification of data to be transferred between the external device and the image data transferring device itself, and specification of a conversion form of image data, and for instructing the external device to transfer the data to be transferred, which is specified by the user, when the data is received from the external device;

data converting means for converting data into image data when the data is transferred to the external device, and for converting transferred image data into data in the conversion form when the data is transferred from the external device; and data transferring means for transferring the data converted into the image data to the external device.

16. A computer-readable portable storage medium, when being used by a computer transferring image data between an external device and the computer itself, on which is recorded a program for causing the computer to execute a process, said process comprising:

receiving, from a user, at least one of specification of data to be transferred between the external device and the computer itself, and specification of a conversion form of image data;

instructing the external device to transfer the image data specified by the user when the image data is received from the external device, and converting the image data transferred from the external device into data in the conversion form; and converting the transferred image data specified by the user into image data when the image data is transferred to the external device, and transferring the image data to the external device.

* * * * *